July 19, 1938. H. L. DOLE 2,123,935
SEPARABLE FASTENER
Filed March 22, 1937

INVENTOR
HARRY L. DOLE
BY *John J Hanrahan*
ATTORNEY

Patented July 19, 1938

2,123,935

UNITED STATES PATENT OFFICE 2,123,935

SEPARABLE FASTENER

Harry L. Dole, Milford, Conn.

Application March 22, 1937, Serial No. 132,251

9 Claims. (Cl. 24—230)

This invention relates to new and useful improvements in separable fasteners and has particular relation to a fastener adapted to be used for securing automobile license plates to their carrying brackets although the fastener may be used in other connections.

An object of the invention is to provide a separable fastener adapted to be operated by a key through the medium of which the fastener may be forced to any necessary extent when it is desired to separate its elements.

Another object is to provide a fastener of the type indicated and which is weather-proof whereby its inner parts are protected.

A further object is to provide a fastener having the characteristics indicated and which is of simple construction and neat and attractive appearance.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:—

Figure 1:
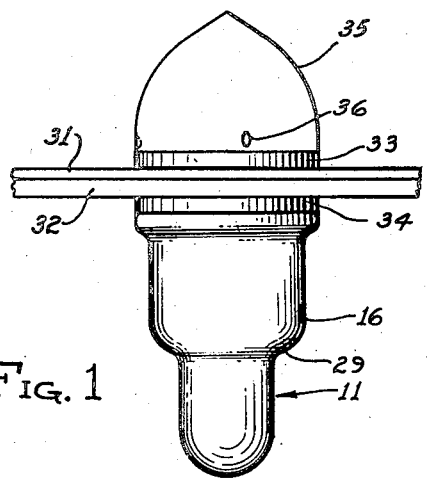
Fig. 1 is an elevational view showing my improved fastener.

Referring in detail to the drawing the improved fastener includes separable members 10 and 11 of which the former comprises a head or button 12 and a hollow stem 13. The opening 14 through the stem 13 extends out through the button 12 and the latter in its edge is provided with a groove 15 the purpose of which will later appear.

The member 11 comprises an outer casing 16 within which is located a cone 17 having its inner edge engaging the casing at 18 and at its outer end having an annular flange 19 over which the outer end of the casing is crimped as at 20. With this arrangement the cone is secured in place in the casing so as to be immovable relative thereto. Also within the casing is a ball clutch means including a tubular element 21 about the upper end of which there is secured an eyelet or collar 22.

The eyelet 22 is held between the overturned or crimped outer end 23 of the element 21 and a bead 24 formed on said element inwardly of the outer or open end thereof. Registering openings 25 are formed in the eyelet and the outer end portion of the element 21 for the reception of balls 26.

In the assembled device 11 the eyelet 22 together with the outer end portion of the element 21 and the balls 26 are held within the cone 17 by means of a coil spring 27 surrounding the element and bearing at one end against the lower end of the eyelet and at its other end against the inner surface of the casing as at 28, a shoulder 29 being formed in the casing for that purpose.

Attention is directed to the fact that the element 21 as well as the casing 16 is closed at its inner end whereby a portion of such member extends across the inner end of the casing and across the inner end of the opening 14 when the stem 13 is in the casing as will presently more fully appear. The closed end of the casing serves to exclude moisture from the parts within the casing.

The balls 26 are free for certain limited movements in the openings 25 and when the stem 13 is inserted into the casing it is received in the element 21 and engages the balls and forces them against the inner surface of the cone 17. In this way the balls are wedged between the cone and the stem 13 with the result that the members 10 and 11 are secured together. When the parts are thus secured together any attempt to pull the stem out of the member 11 tends to further move the balls, eyelet and element upwardly in the cone and to cause additional wedging of the stem by the balls so that the members 10 and 11 may not be separated by a simple movement tending to pull them apart.

To separate the members the clutch means above referred to must be moved inwardly toward the larger diameter portion of the cone 17. This is accomplished by inserting a key 30 through the opening 14 in the head and stem of member 10 to have the key engage the closed end of the element 21 and then on the key being pushed or struck, the element, together with the eyelet and the balls, is carried inwardly into such positions that the balls may move toward the cone and away from the stem whereupon the latter is released and may easily be withdrawn from the member 11.

Figure 2:
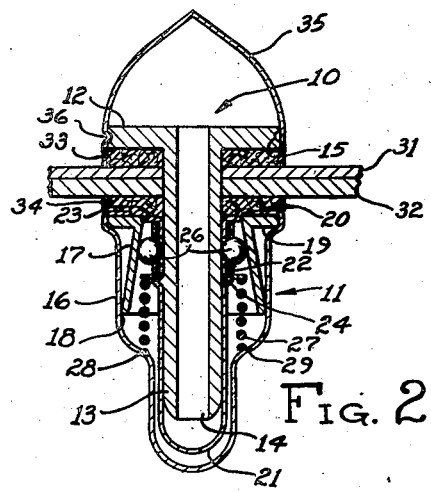
Fig. 2 is a longitudinal sectional view through the fastener and showing the same securing a portion of a license plate to a bracket as in Fig. 1.
Figure 3:
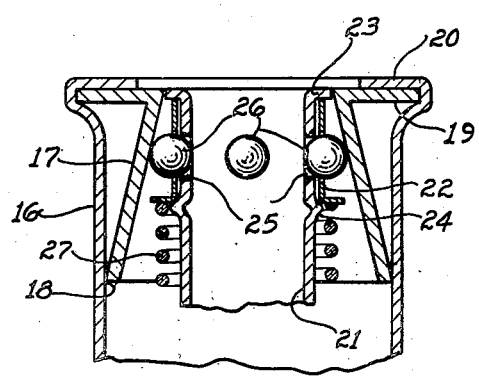
Fig. 3 is an enlarged detail sectional view through the clutch portion of the fastener.

Fig. 2 in section and Fig. 1 in elevation show the improved fastener securing a portion 31 of a license plate or the like to a portion 32 of a bracket or the like. It is noted that a pair of compressible gaskets 33 and 34 are about the stem 13, one such gasket being immediately beneath the head or button 12 while the other is against the open end of the casing 16. These gaskets prevent rattle and also serve to seal the open end of the casing about the stem 13.

To give the fastener a finished appearance and to prevent moisture entering the same through the opening 14 in the stem 13 a cap 35 is provided. This cap is formed of a springy sheet metal, as brass, and adjacent its open end is provided with the desired number of lugs 36, three such lugs being shown. As the cap is pressed into place over the button 12 the lugs 36 snap into the groove 15 whereby the cap is securely held in place on the button. The cap is readily removable to expose the opening 14 for the insertion of the key 30 so as to release the clutch means from the stem 13 as above explained. The ring portion 37 of the key may be used to remove the cap from the button 12.

Figures 6, 7, 8:
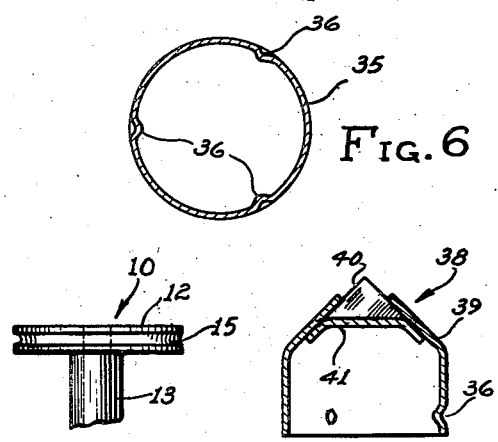
Fig. 6 is a view looking into the open side of a cap employed.
Fig. 7 is an elevational view showing the head or button portion of a bolt employed.
Fig. 8 is a sectional view showing a closure cap provided with a glass or reflecting top.
Figures 4, 5:
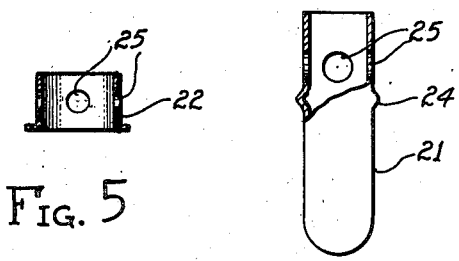
Fig. 4 is a view in side elevation, with a part broken away, showing a tubular member employed.
Fig. 5 is a somewhat similar view showing an eyelet member employed.
Figure 9:
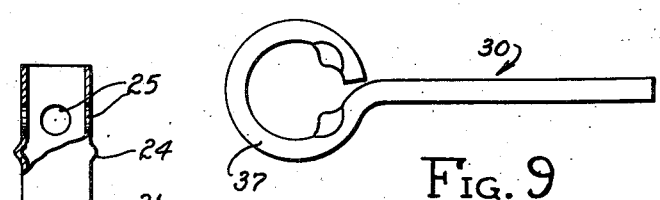
Fig. 9 is an elevational view showing a key employed.

Instead of the cap 35 a cap 38 as shown in Fig. 8 may be used. Cap 38 includes a sheet metal annulus 39 to be pressed onto the button or head 12 as in the case of the cap 35, and one end of the annulus is closed by a glass reflector 40 held in place by a disc or metal insert 41, the inner edge portion of the reflector being of a diameter too great to pass through the opening at the outer end of the annulus.

Having thus set forth the nature of my invention, what I claim is:—

1. In combination, a member including a button and a stem, a member including a casing open at one end to receive said stem, means within said casing to engage said stem and secure the members together, and said stem having an opening therein for the insertion of a key therethrough into said casing to move and thereby release said means.

2. In combination, a member including a button and a stem, a member including a casing open at one end to receive said stem, means within said casing to engage said stem and secure said members together, said means including a part at the inner end of the stem, and said stem having a longitudinally extending opening therethrough from the outer end thereof for the insertion of a key therethrough into the casing to shift said part and thereby release said means from the stem.

3. In combination, a member including a button and a stem, a member including a casing open at one end for the insertion of said stem, means including a spring pressed ball clutch within said casing to engage said stem when so inserted and secure said members together, and said stem having an opening therethrough from the outer end thereof for the insertion of a key therethrough into the casing to move and thereby release said means.

4. In combination, a member including a button and a stem, a member including a casing open at one end to receive said stem, means within said casing to engage said stem and secure said members together, said stem having an opening therethrough from the outer end thereof for the insertion of a key therethrough into the casing to move and thereby release said means from the stem, and a pair of compressible sealing gaskets between said button and the open end of the casing member.

5. In combination, a member including a button and a stem, a member including a casing closed at one end and open at its other end to receive said stem, means within said casing to engage said stem and secure the members together, said means including a part at the inner end of the stem, said stem having a longitudinally extending opening therethrough from the button end thereof for the insertion of a key into said casing to shift said part and thereby release said means from the stem, and a removable cap on said button and normally closing the outer end of the longitudinally extending opening through the stem.

6. In combination, a member including a button and a stem, a member including a casing closed at one end and open at its other end to receive said stem, means within said casing to engage said stem and secure said members together, said stem having an opening therein for the insertion of a key therethrough into said casing to move and thereby release said means from the stem, and a removable cap on said button and normally closing the outer end of said opening.

7. In combination, a member including a button and a stem, a member including a casing open at one end to receive said stem, means within said casing to engage said stem and secure said members together, said means comprising a spring pressed ball clutch including a part at the inner end of said stem when the latter is within the casing, and said stem having a longitudinally extending opening therethrough for the insertion of a key into said casing to engage and move said part and thereby release said means from the stem.

8. In a separable fastener, a casing member, a member including a stem insertable into said casing member, means within the latter to engage said stem and secure the members together, and a key insertable into said casing member to force said means to released position whereby to permit of separation of the members.

9. In combination, a member including a button and a stem, a member including a casing open at one end to receive said stem, a ball clutch within the casing, a spring normally urging said clutch toward the open end of the casing, said clutch adapted to release on being moved inwardly with respect to the open end of the casing, said clutch adapted to engage said stem when inserted into the casing and secure said members together, and said stem hollow for the insertion of a key therethrough into the casing to engage said clutch and force it inwardly with respect to the open end of the casing whereby to release the stem.

HARRY L. DOLE.